Sept. 21, 1926.
E. H. THOMPSON
UNIVERSAL FARE BOX
Filed Sept. 20, 1920   8 Sheets-Sheet 6
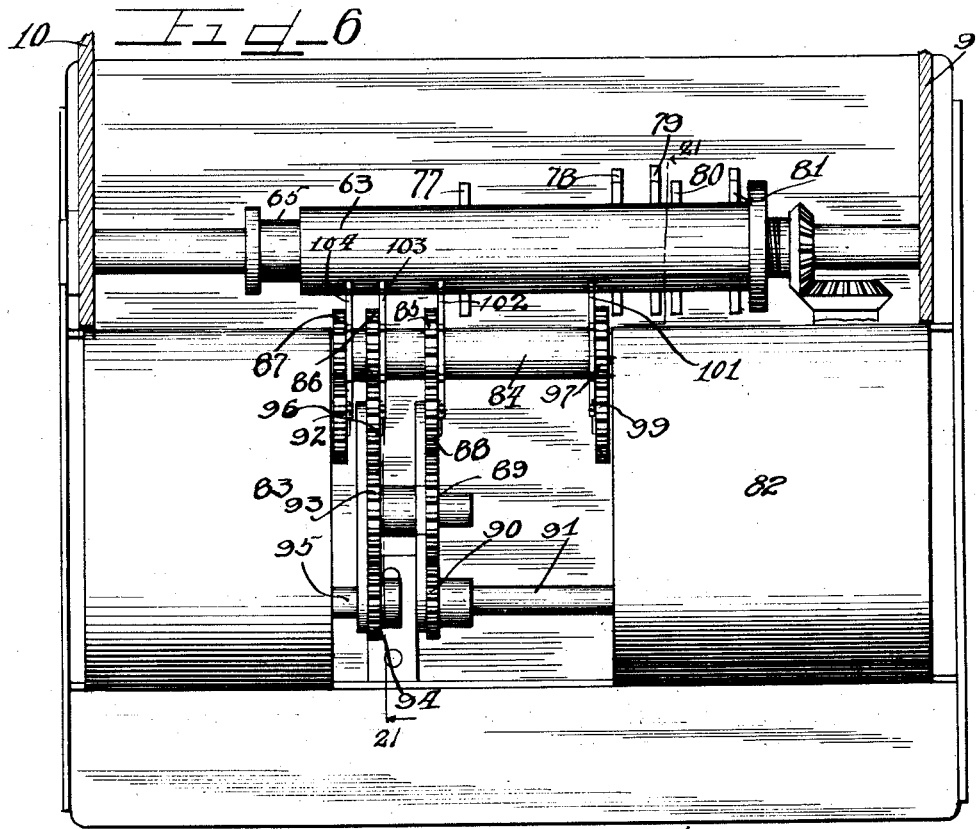
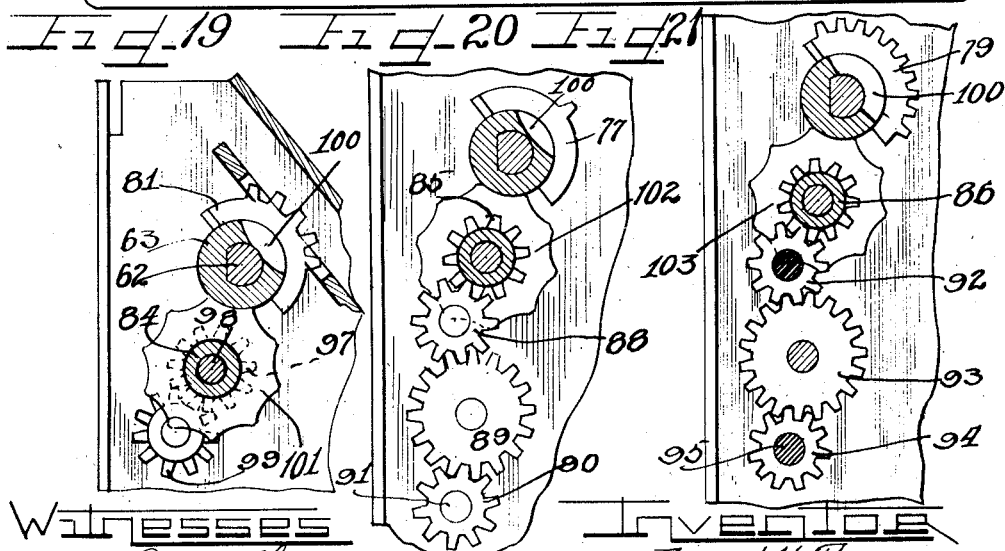

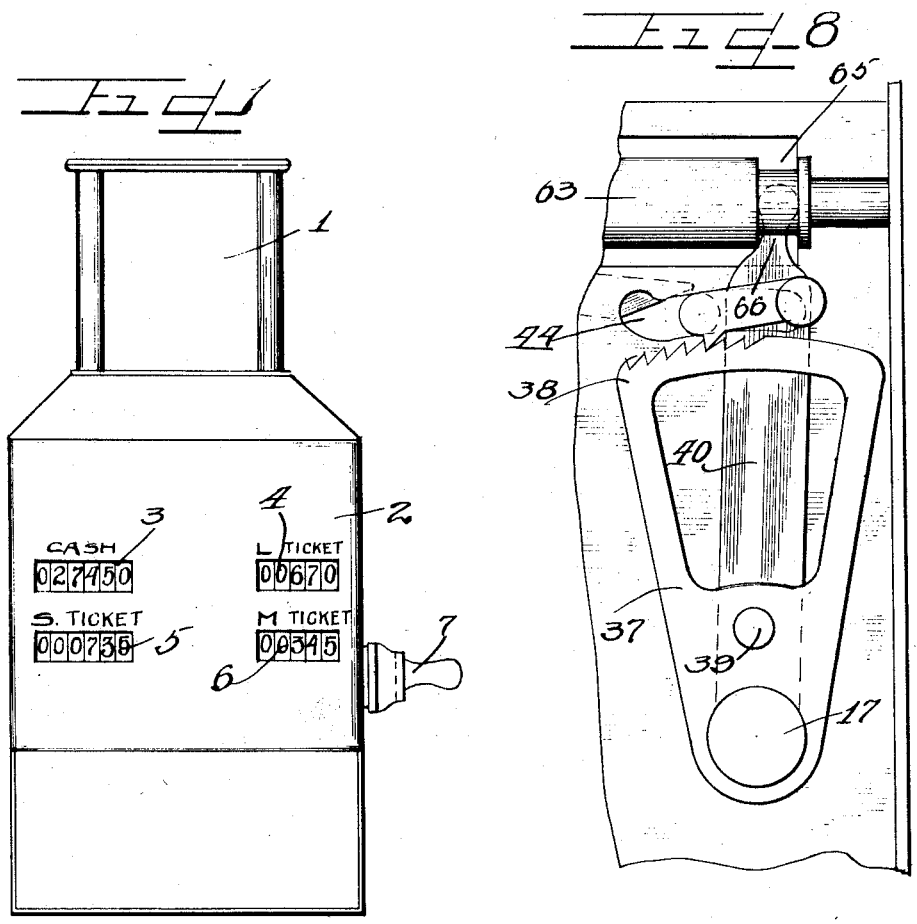

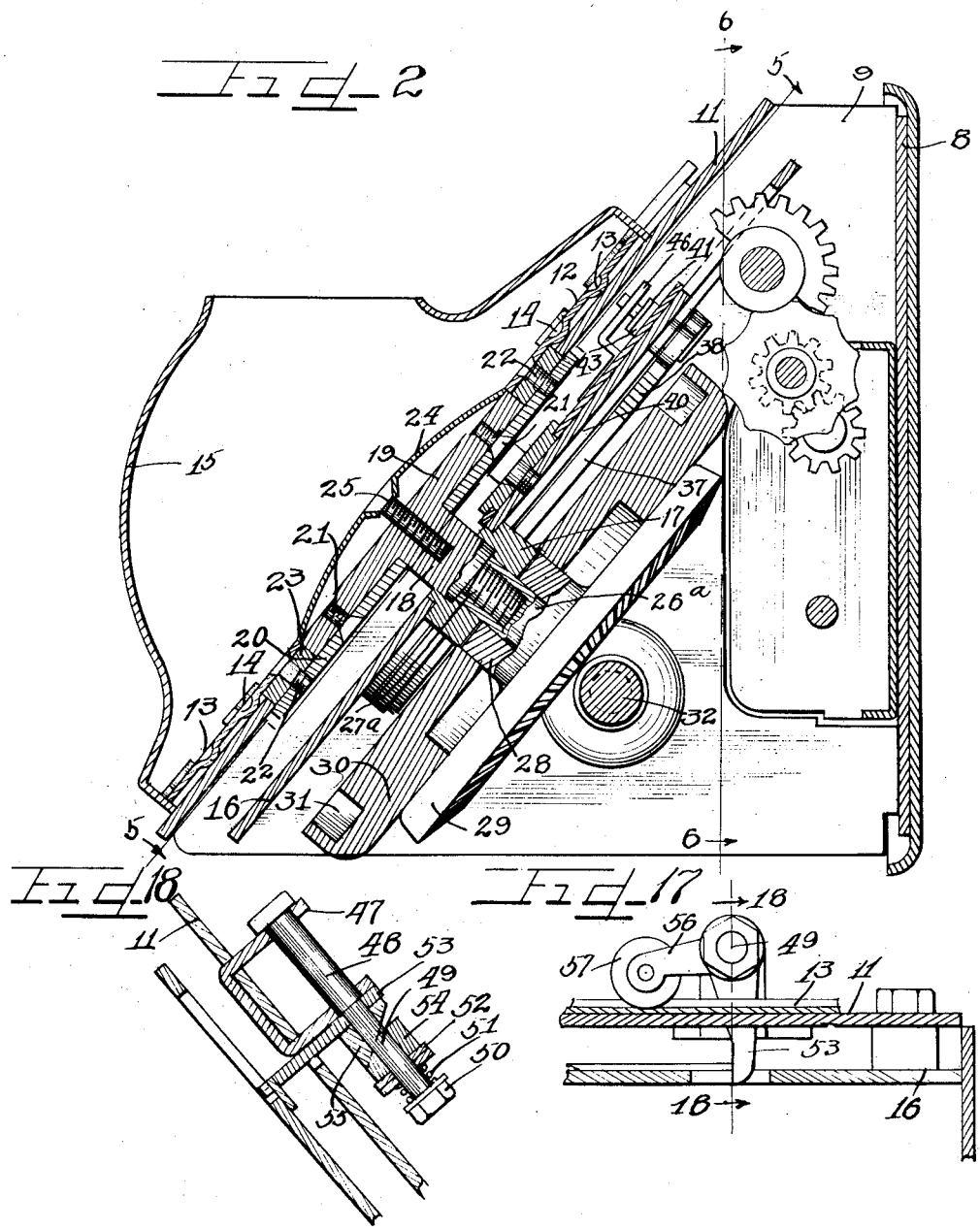

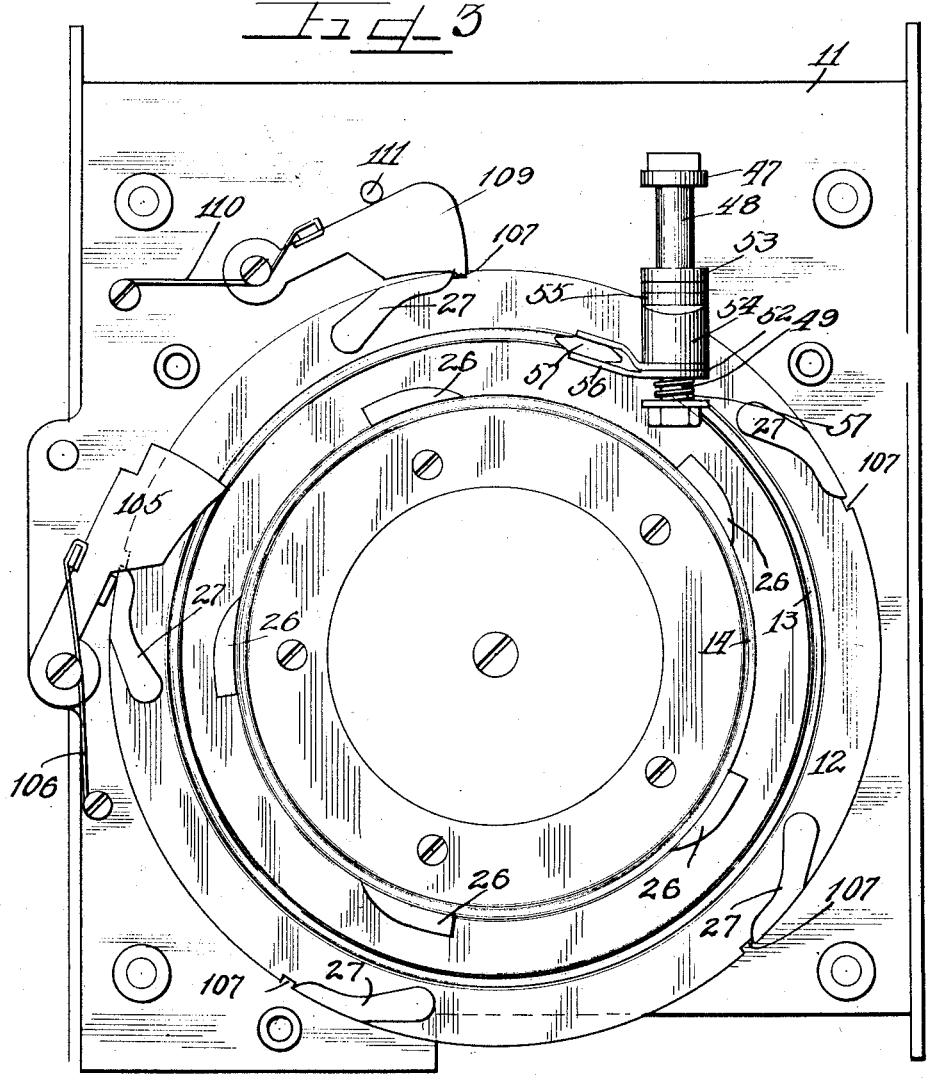

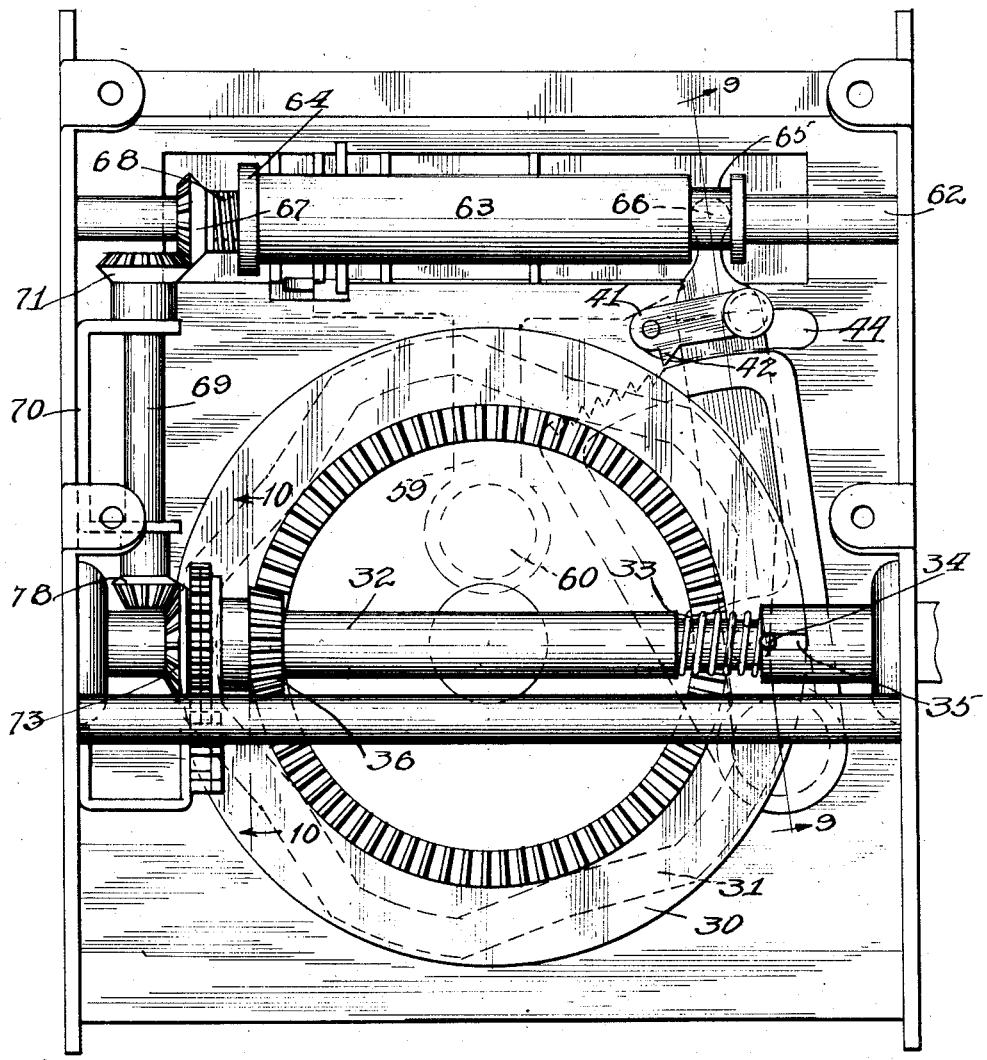

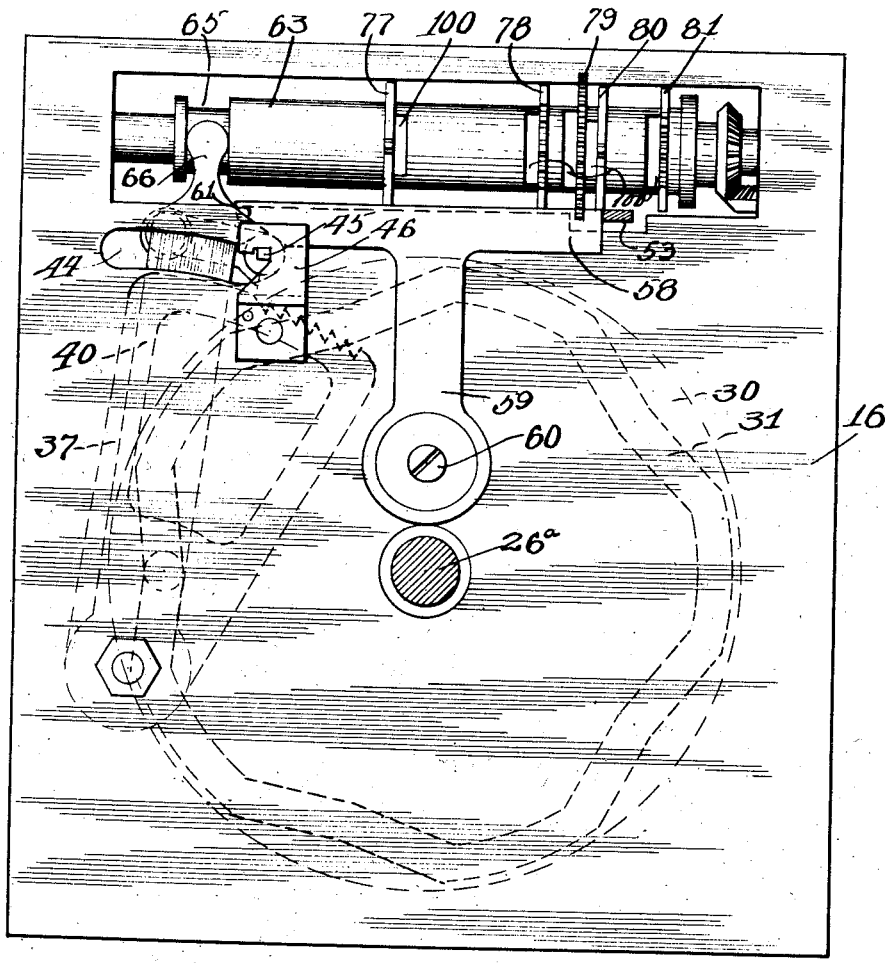

Sept. 21, 1926.  
E. H. THOMPSON  
UNIVERSAL FARE BOX  
Filed Sept. 20, 1920   8 Sheets-Sheet 7
1,600,657
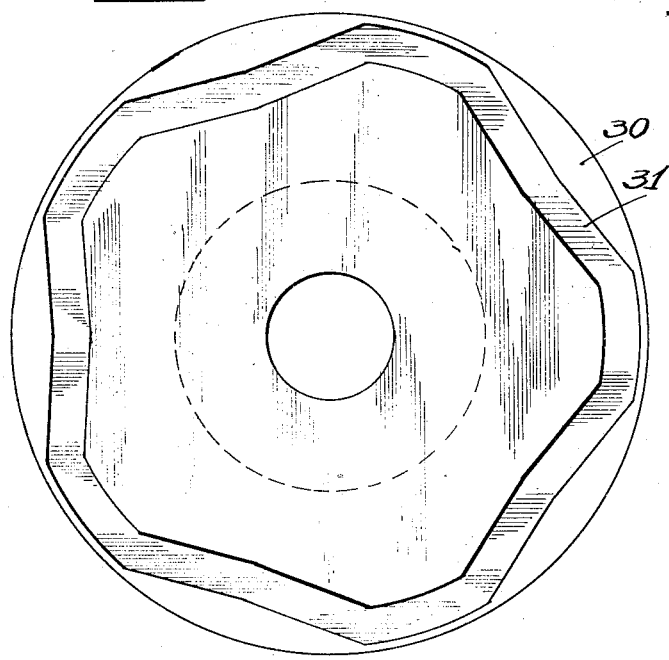
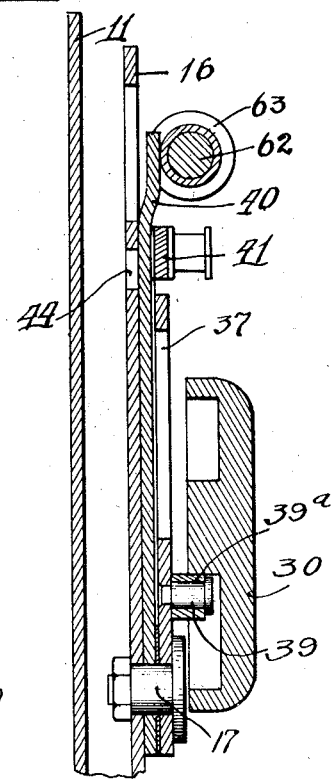
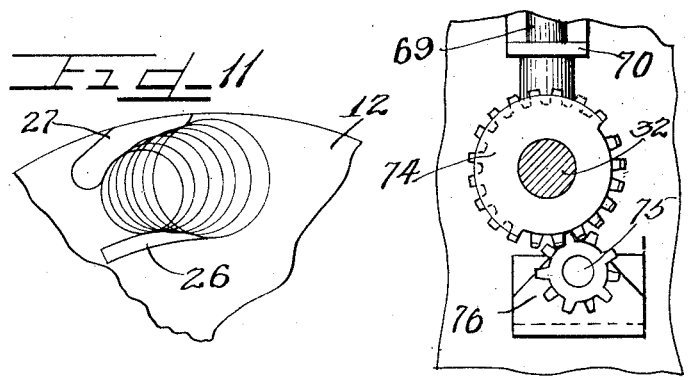
Witnesses  
J. W. Angell  
Charles Pillsbury Jr.
Inventor  
Ernest H. Thompson  
by Charles O. Hill  
Atty.

Sept. 21, 1926.
E. H. THOMPSON
UNIVERSAL FARE BOX
Filed Sept. 20, 1920     8 Sheets-Sheet 8
1,600,657
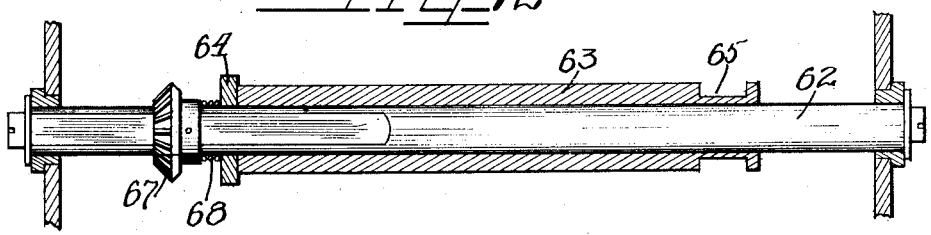
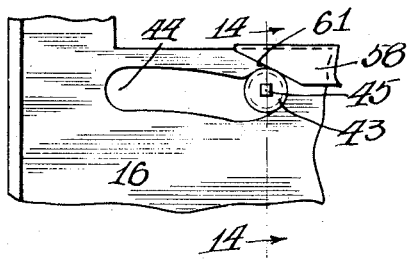
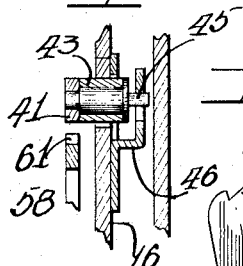
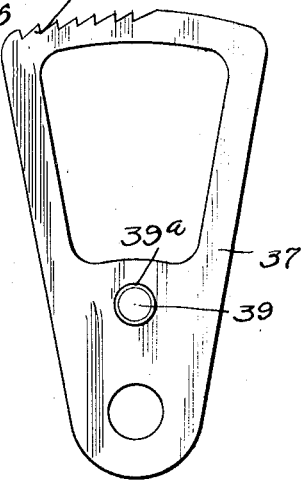
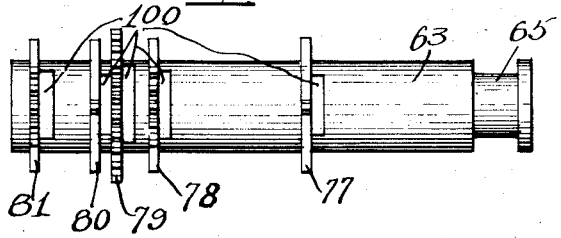

Patented Sept. 21, 1926.

1,600,657

UNITED STATES PATENT OFFICE.

ERNEST H. THOMPSON, OF CHICAGO, ILLINOIS, ASSIGNOR TO JOHNSON FARE BOX COMPANY, A CORPORATION OF NEW YORK.

UNIVERSAL FARE BOX.

Application filed September 20, 1920. Serial No. 411,504.

This invention relates to a universal fare box of a type which is adapted to receive and register cash fares comprising coins of different denominations and also to receive and separately register tokens of different characteristics, each of which represents a distinct fare.

In former fare boxes, it has been necessary to provide special mechanisms to meet the demands of different localities and different traction systems. This condition has forced manufacturers to make special series of fare boxes for different lines, and transportation companies using these fare boxes have been compelled to discard or to remodel the same upon a change in fare rates. A study of the above conditions at once shows the need of a universal fare box that is reliable and durable and that is so constructed that it is not easily damaged by hard usage. The considerations of accuracy and durability in a fare box make necessary a construction having a minimum of light springs and moving parts and require that the action of the moving parts be as far as possible a positive one.

It is also desirable that the mechanisms which are provided for controlling the registration of the coins or tokens be so arranged and constructed that mutilated or worn coins or tokens will be properly registered.

It is an object therefore of this invention to provide a fare box which is adapted to receive and register a plurality of coins and tokens of distinct physical characteristics.

It is also an object of this invention to provide a fare box having a plurality of registering and indicating mechanisms controlled by the physical characteristics of coins and tokens received thereby.

It is a further object of this invention to provide a fare box having timed cam operated registering mechanisms controlled by coins or tokens deposited therein.

It is another object of this invention to provide a fare box having registering mechanisms controlled by coin or tokens deposited therein, and having means whereby said coin controlled registering mechanisms are automatically released in case of accident to the fare box.

It is also an object of this invention to provide a fare box wherein registering mechanisms are controlled by the thickness and diameter of coins or tokens received thereby and wherein said mechanisms are locked against actuation except upon the receipt of a proper token or coin.

It is an important object of this invention to provide a fare box wherein registering mechanisms are controlled by a plurality of physical characteristics of coins and tokens received thereby.

It is finally an important object of this invention to provide a universal fare box adapted to receive and separately register a plurality of coins and tokens.

Other and further important objects of this invention will be apparent from the disclosures in the drawings and specifications.

The invention (in a preferred form) is shown on the drawings and hereinafter more fully described.

On the drawings:

Figure 1 is a view in elevation of a fare box embodying the principles of this invention.

Figure 2 is a central vertical section through the receiving and registering mechanisms of the fare box.

Figure 3 is an enlarged front elevation of the coin or token receiving disk.

Figure 4 is a rear elevation of the receiving and registering mechanism showing the drive therefor.

Figure 5 is an enlarged section on the line 5—5 of Figure 2 with parts omitted.

Figure 6 is an enlarged section on the line 6—6 of Figure 2 with parts omitted and parts shown in elevation.

Figure 7 is a top plan view of the cam driving plate.

Figure 8 is a fragmentary enlarged elevation of the shifting mechanism.

Figure 9 is an enlarged fragmentary section on the line 9—9 of Figure 4.

Figure 10 is an enlarged fragmentary section on the line 10—10 of Figure 4.

Figure 11 is a fragmentary diagrammatic view showing the method of carrying coins or tokens on the carrier plates.

Figure 12 is an enlarged sectional detail of the shifting sleeve.

Figure 13 is an enlarged fragmentary elevation of the cam locking mechanism.

Figure 14 is a fragmentary section on the line 14—14 of Figure 13.

Figure 15 is an enlarged elevation of the shifting ratchet.

Figure 16 is an enlarged elevation showing the shifting shaft and the mutilated gears associated therewith.

Figure 17 is an enlarged sectional detail of the coin contacting mechanism.

Figure 18 is a fragmentary section on the line 18—18 of Figure 17.

Figures 19, 20 and 21 are fragmentary details showing the connecting gear trains between the mutilated gears on the shifting shaft and the registering and indicating registers.

As shown on the drawings:

Figure 1 shows a universal fare box which is constructed according to the principles of this invention and in which the reference numeral 1 indicates a receiving and inspection chamber by which coins or tokens are conveyed to the registering mechanisms which are contained in the casing 2. Said registering mechanisms indicate the cash total of fares received on a totalling register 3, while metal tickets or tokens which are received are indicated on the ticket register indicators 4, 5 and 6 respectively. A crank 7, which is secured to the outer end of a shaft journalled in said casing 2, affords means for actuating the various registering mechanisms which operate in a manner which will be hereinafter described.

Figure 2 shows the arrangement of the registering mechanisms inside the casing 2. For supporting said registering mechanism a plate 8 is secured to one wall of said casing 2, and secured to said plate and extending at right angles therefrom along other walls of the casing 2, are plates 9 and 10, which are cut at an angle as shown in Figure 2 and on which is supported a plate 11, which is provided at its central portion with a large annular opening. Rotatably carried on the outer face of said plate 11, is an annular coin carrying or receiving disk 12, and said carrying disk 12 is provided with concentric grooves 13 and 14, as clearly shown in Figure 3, for a purpose to be described hereinafter. Coins or tokens which are conveyed downwardly through the inspection chute 1 are received in a hopper 15, which surrounds the receiving disk 12 and is of substantially the form shown in Figure 2. Supported between the end plates 9 and 10 and located inside and parallel to the plate 11, is a plate 16, and rotatably supported in a boss 17 mounted in said plate 16 is a hub 18, which is connected to the receiving disk 12 to rotate the same. A connection between said receiving disk 12 and the hub 18 is afforded by a flange 19 integral with said hub 18 and rotatable in the opening in the plate 11 and having a plate 20 secured thereto by means of screws 21. Secured to the outer face of said plate 20 by means of screws 22, which engage therethrough and through the receiving disk 12, is a ring 23 which affords a connection between said receiving disk and the plate 20.

In order that coins or tokens entering the hopper 15 may be deflected to the outer edge of the receiving disk 12, the flange 19 is enclosed by a dome-shaper cover 24 which extends from the inner edge of said annular disk 12 and which is secured to the hub 18 by screw 25 engaged through an aperture in its central portion. For properly positioning the coins or tokens on the receiving disk 12, spaced pockets are formed on the face thereof between projections 26 and 27 which are arranged on the face of said disk in such a manner that the coins or tokens will recede further into said pockets formed between said projections or project farther therefrom according to their diameter. The arrangement of the pockets between the projections 26 and 27 is clearly shown in Figures 3 and 11.

Engaged through the boss 17 and abutting the inner end of the hub 18 is a short shaft $26^a$, which is connected to said hub 18 by means of a screw $27^a$, as clearly shown in Fig. 2. Secured to the inner end of said shaft $26^a$ is an apertured hub 28 of a bevel gear 29, and non-rotatably secured to said hub 28 and resting on the bevel gear 29 is a cam plate 30 which has a cam groove 31 in the upper face thereof. Said cam plate 30, which is shown in detail in Figure 7, rotates with the bevel gear 29 and acts to transmit a timed motion to certain of the registering mechanisms in the manner to be described hereinafter.

Means are provided whereby the bevel gear 29 is rotated when the crank is turned. For this purpose a shaft 32 is journalled transversely of the frame plates 9 and is adapted to be operatively connected to the crank 7 by spring clutch comprising a spring 33 and a pin 34 which is adapted to be engaged in a notch 35 in the shaft of the crank. Power from the shaft 32 is transferred to the bevel gear 29 and causes rotation thereof through the bevel pinion 36 which is secured to said shaft and meshes with said bevel gear, as clearly shown in Figure 4. Pivoted about the hub 17 is a ratchet arm 37 having teeth 38 at the upper end thereof and having a pin 39 extending outwardly from the lower portion of its face. Said pin 39, which has a roller $39^a$ thereon, is adapted to engage in the cam slot 31 in the cam plate 30, and due to said engagement the rotation of said cam plate 31 causes a rocking of the ratchet arm 37 back and forth about the hub 17.

Pivoted on the hub 17 adjacent the ratchet arm 37 is a lever 40, and means are provided whereby said lever 40 may be connected to said ratchet arm and locked to move therewith. Pivoted on said lever 40 is a pawl 41, which is provided with a tooth 42 adapted to engage in the notches between the teeth 38 on the ratchet arm 37. Pivoted on the free end of the pawl 41 adjacent the tooth 42 is a roller 43 which is adapted to engage in a cam slot 44 formed in the plate 16, as clearly shown in Figures 4 and 5. Said roller 43 is shown in detail in Figure 13, and extending from the outer end thereof is a squared pin 45 which is adapted to be engaged in a rectangular slot in a bracket 46 on said plate 16, to lock the roller 43 in the extreme end of the cam slot 44 and to normally lock the lever 40 from movement about the hub 17.

Means are provided for disengaging the pawl 41 from the squared slot in the bracket 46 and allowing the tooth 42 thereon to engage between the teeth 38 on the ratchet arm 37. The point of engagement of said tooth 42 is determined by the diameter and thickness of the coin or token in a manner which will now be described. As shown in Figures 3, 17 and 18, a bracket 47 is mounted in the upper side of the plate 11 adjacent the receiving disk 12, and supported in said bracket is a shaft 48, the inner end 49 of which extends outwardly from said bracket, as clearly shown in Figures 3 and 18. A nut 50 is engaged on the outer end of the extension 49 on the shaft 48 and engaged around said extension 49 inside the nut 50 is a coiled spring 51, and rotatively mounted on said extension 49 between the coiled spring 51 and the bracket 48 are arms 52 and 53 which extend outwardly from said shaft at substantially right angles to each other, and which are connected so that the rotation of one of said arms about the extension shaft 49 normally causes the rotation of the other of said arms thereabout. This connection between the arms 52 and 53 is effected by means of cam blocks 54 and 55, which are respectively secured to the inner faces of said arms and which are rotatable about the extension shaft 49. A detail of said cam blocks is shown in Figure 18, and it will be apparent from an examination of said figure that the faces thereof are so constructed that when an excessive strain is placed upon either of the levers 52 or 53, the block 54 will tend to slide on the block 55 and be forced outwardly on the extension shaft 49 against the compression of the spring 51, thus releasing the connection between the levers 52 and 53 afforded by said cam blocks 54 and 55, and preventing damage to the mechanism controlled by said levers in case either becomes damaged or stopped by foreign matter or improper coins or tokens. The lever 52 extends outwardly from the extension shaft 49, and at its outer end is provided with a bifurcated portion 56 in which is pivoted a small wheel 57, which is adapted to normally tract in the annular groove 13 in a receiving disk 12. The lever 52 extends downwardly from the extension shaft 49 through notches in the plates 11 and 16, and the outer end thereof is adapted to engage the end of the horizontal portion 58 of a T lever 59 which is pivoted on said plate 16 at 60. The opposite end of said horizontal portion 58 is provided with a bevel or cam portion 61 which is adapted to engage the roller 43 and thereby disengage the squared pin 45 from the slot in the bracket 46 and thus allow the pawl 41 to drop downwardly so that the tooth 42 thereon is engaged in the adjacent teeth on the ratchet arm 37. Movement of said T lever 59 is of course effected when a coin or token is carried upwardly on the receiving disk 12 and in passing under the wheel 57 moves the same outwardly from the groove 13, thereby rocking the arms 52 and 53 across the extension shaft 49 and causing the arm 53 to engage the horizontal portion 58 of the T lever 59. Since the rocking back and forth of the ratchet arm 37 is accurately timed with the rotation of the receiving disk 12, the time of engagement of said wheel 57 with the coin will of course determine at what point the tooth 42 on the pawl 41 will engage between the teeth on the ratchet arm 37, and will consequently govern the length of the throw of the lever 40. The throw of the lever 40 is utilized to operate the various registering mechanisms in a manner which will now be described.

As shown in Figures 4, 5, 6 and 8, a shaft 62 is pivoted between the frame plates 9 and 10 above the shaft 32 and inside the plate 16, and slidably but non-rotatably mounted on the shaft 62 is a hollow shifting shaft 63, which is provided at one end with a flange 64, and at the opposite end with a peripheral groove 65, in which a rounded extension 66 of the lever 40 is adapted to be engaged whereby the rocking of said lever 40 will tend to shift the hollow shaft 63 longitudinally on the shaft 62. A bevel pinion 67 is secured to the shaft 62 adjacent the flange 64 on the shifting shaft 63, and engaged between said flange and said bevel pinion 67 is a coil spring 68 which acts to cushion the outward movement of the shaft. The bevel pinion 67 provides means whereby the shaft 62 is operatively connected with the shaft 32 and the crank 7 and whereby rotation of said crank brings about a rotation of said shaft 62. Said bevel pinion 67 is connected with the shaft 32 by means of a vertical shaft 69 which is journalled in a bracket 70 secured to one of the end plates 9, and which is provided at its upper end with the bevel pinion 71 engaging said bevel pinion 67, and at its lower end with the bevel pinion 78 which meshes with the bevel pinion 73 rotatably mounted on the shaft 32. Means are provided whereby the rotation of the shaft 32 is transmitted only intermittently to the vertical shaft 69. For this purpose a Geneva gear 74 is mounted on said shaft 32, and is adapted to mesh with a Geneva pinion 75 journalled in a bracket 76 beneath said shaft 32. Said Geneva gear 74 and the pinion 75 are adapted to intermittently transmit the rotation of the shaft 32 through the vertical shaft 69, but since any convenient means of transmitting this intermittent movement may be employed, this Geneva conection will not be more specifically described herein.

As a result of the various connections heretofore described, the rotation of the crank 7 is transmitted to the shaft 32 and through the bevel pinion 36 to the bevel gear 29 to rotate the cam plate 30 and the coin or token receiving disk 12 to rock the ratchet arm 37 on the hub 17, and to intermittently rotate the shaft 62 through the Geneva mechanisms 74—75, whereby the shifting shaft 63 which affords a connection to the registering mechanisms is rotated. The connections to the registering mechanisms will now be described in detail.

As shown in Figure 5, mutilated gears 77, 78, 79, 80 and 81 are mounted on the shifting shaft 63 and are adapted to be shifted thereby into mesh with gear trains connecting them with the proper registering mechanism. Said mutilated gears provide means whereby large, medium and small tokens are registered, and also provide means for registering pennies, five-cent pieces, dimes and Canadian five-cent pieces. The number of teeth on the mutilated gears and the position of said gears on the shaft of course determine the registering mechanism with which they will be brought into connection by the shifting of said shaft 63. Certain of these gear trains are shown in detail in Figures 19, 20 and 21, and comprise means whereby the mutilated gears 81 and 77 respectively are connected with suitable registering devices which comprise standard registers or counters and which are mounted is casings 82 and 83, as shown in Figure 6. Since said registers are of a standard type which is usual and well known in fare box construction, they will not be described in detail herein. The arrangement of the mutilated gears 77, 78, 79, 80 and 81 and the gear trains with which they mesh to actuate the various registering mechanisms is clearly shown in Figure 6. A shaft 84 is journalled between the casings 82 and 83 and mounted on said shaft are gears 85, 86, and 87, which are adapted to be selectively engaged by the mutilated gear 77 to actuate the registers 4, 5 and 6 to register large, medium or small tickets or tokens. When the mutilated gear 77 is shifted into engagement with gear 85 by the shifting of the shaft 63 due to the rocking of the lever 40 and the extension 66 thereon, said gear 77 is adapted to engage the gear 85 to rotate the same on the shaft 84, whereby movement is conveyed to the small ticket or token register 5 through a gear train 88, 89 and 90 and a shaft 91. In case a medium size token is deposited on the receiving disk 12, the shaft 63 is shifted such a distance that the mutilated gear 77 engages the gear 86 and a medium size ticket or token register 6 is actuated through a gear train comprising gears 92, 93, 94, and through a shaft 95 on which the gear 94 is mounted. Large tickets or tokens are registered on the register 4, by the shifting of the shaft 63 so that the mutilated gear 77 engages the gear 87, the movement of which is transmitted to the register 4 through the gear 92 meshing therewith.

In order that the proper amount of cash fare may be registered on the totalling register 3, the gears 78, 79, 80 and 81 are respectively provided with the proper number of teeth to effect the registration of a Canadian five-cent piece, a dime, a penny or a nickel said coins increasing in size in the order named. Said gears are adapted to be selectively brought into register with a gear 97 which is mounted on a reduced portion 98 of the shaft 84, and the movement of said gear 97 is transmitted to the register 3 through a gear 99 which is pivoted on the outside of the casing and meshes with said gear 97.

As shown in Figure 21, the gear 79 has ten teeth, and when it is shifted into mesh with the gear 97 by the shifting of the shaft 63, it rotates said gear and the gear 99 through a sufficient angle to register ten cents on the register 3.

Likewise the gears 78 and 81 are each provided with five teeth and act to cause the registration of a nickel or the Canadian five-cent piece, while the gear 80 has one tooth and registers the receipt of a cent.

Interlocking means are provided to prevent the spinning of shaft 84 or the operation thereof when the one of the mutilated gears has not been shifted into proper position. For this purpose an opening 100 is provided in the shaft 63 adjacent each of the multilated gears mounted thereon and interlocking cam plates 101, 102, 103 and 104 are mounted on the shaft 84 and secured to the gears 97, 85, 86 and 87 respectively and adapted to engage the shaft 63 to prevent rotation of the shaft 84 without preventing the rotation of the shaft 63. The construction of said cam plates is clearly shown in Figures 19, 20 and 21. When a mutilated gear is shifted into proper position, however, the interlocking cam which is adjacent to the gear which is to be in mesh with its proper mutilated gear engages in the opening 100 adjacent thereto and allows the gear to which it is secured to rotate and effect a registration.

To prevent the piling up of coins or tokens on the receiving disk 12, a clearing pawl 105, which is clearly shown in Figure 3, is provided. Said clearing pawl is actuated by a spring 106 and rides over the upper side of the receiving disk 12 to prevent the piling up of coins or tokens between the projections 26 and 27, and to make sure that only one coin or token passes under the roller 57 at a time.

A mechanism is also provided to prevent the turning of the receiving disk 12 in a reverse direction. For this purpose a plurality of notches 107 are provided in the periphery of said receiving disk adjacent the outer end of the projections 27 and a stripper pawl 109 which is actuated by a spring 110 is adapted to engage in said notches and to be forced therefrom by the projections 27 as the receiving disk is turned in a clockwise direction. A stop 111 which extends from the face of the plate 11 limits the outward movement of said pawl 109.

The operation is as follows:

Coins or tokens are deposited in the inspection chamber 2 and the crank 7 is rotated so that the same may be registered on the cash register 3 or on the proper ticket register 4, 5 or 6. The coins and tokens fall from the inspection chute 2 down into the hopper 15, and on the receiving disk 12 which is rotated by the rotation of the crank 7. Due to this rotation of the receiving disk 12, the coins and tokens are engaged between the projections 26 and 27 on said disk, and are carried upwardly, excess coins being forced to the bottom of the hopper by the clearing pawl 105, and as this upward movement continues, the coins or tokens carried by the plate are individually brought into contact with the roller 57 and the various mechanisms which register said coins or tokens are brought into operation in a manner dependent upon the time of contact of said rollers therewith. This time of contact of course depends upon the diameter of the coins or tokens, and upon the thickness thereof.

It is thus apparent that a very sensitive detecting mechanism is provided. Since the detecting means are both affected by thickness and diameter, it is also possible to properly detect and register coins or tokens which have been badly mutilated, as by having the edges thereof battered or by being hammered thin. This is an effect which it is not possible to obtain in those types of fare boxes wherein the registration has been controlled by either the thickness or the diameter of the coin or token alone.

After engagement under the roller 57, further movement of the receiving disk 12 carries the coins or tokens past the same, and they are conveyed outwardly from the hopper 15 by a suitable clearing mechanism.

As has been previously described, the rotation of the crank 7 is transmitted to the ratchet arm 37 through the cam plate 30, which rotates simultaneously with the receiving disk 12 and due to the peculiar form of the cam groove 31, the movement of said ratchet arm 37 is timed to correspond with the passage of the coins or tokens under the roller 57. The engagement of the coin or token under said roller causes the T-lever 59 to be rocked about the pivot 60, whereby the roller 43 is released and the pawl 42 is engaged between the teeth 38 on the ratchet arm 37. Since the movement of said ratchet arm is timed with the movement of the receiving disk, the point of engagement of the tooth 42 on said pawl between the teeth 38 on said arm will be determined by the time of engagement of the roller 57 with the coins or tokens. The engagement of the tooth 42 on the pawl 41 between said teeth 38 connects the lever 40 with the ratchet arm 37, and since the extension 66 on said lever 40 is engaged in the notch 65 in the shifting shaft 63, further movement of said ratchet arm is transmitted to said shifting shaft and acts to shift the proper mutilated gears into mesh with one of the gears 85, 86, 87 or 99 to register the receipt of the ticket or token or to register the cash value of the coins received upon the proper registers 3, 4, 5 or 6. The positive return of the lever is assured by the fact that the travel of the roller 43 is limited to the cam slot 44, and the tooth 42 is thereby held in engagement between the teeth 38 until the return travel is completed and the squared pin 45 again engaged in the squared notch in the bracket 46. Thus a positive shifting motion which is independent of springs is provided, the spring 68 being merely provided to afford a cushion for the end of the shifting shaft 63.

The interlocking cam disks 101, 102, 103 and 104, which are secured to the gears 97, 85, 86 and 87 respectively and rotatable therewith, prevent the rotation of said gears at all times except when the proper mutilated gear is in mesh therewith, at which time the openings 100 in the shifting shaft 63 allow for the free rotation of the interlocking cam disks.

The spring actuated pawl 109 engages in the notches 107 in the receiving disk 12 and acts to prevent reverse rotation thereof.

Thus it is apparent that interlocking means are provided which prevent the effecting of improper registration by reverse rotation of the machine or by spinning thereof.

This invention provides a universal fare box which is adapted to operate with a plurality of tickets or tokens having different physical characteristics and which is also adapted to register the cash amounts of various coins received. Since the various mechanisms are positively operated, and since there are no spring actuated working parts, the construction of the machine may be very strong, and there is little likelihood of accidental damage thereto. Because of the universal feature of the machine and its adaptation to various sizes of coins or tokens or tickets, it is possible to construct a single machine which is adapted to meet the demand of various transportation lines, and thus the standardization and consequent economical manufacture thereof is made possible.

While a particular operative construction for a particular combination of tokens and coins has been shown and described herein, it is not intended to limit this invention to such an arrangement. It is apparent that various arrangements of the mutilated gears and the shifting shaft 63 might be made to provide for registration of different coins or tokens.

I am aware that numerous details of construction may be varied through a wide range without departing from the principles of this invention, and I therefore do not purpose limiting the patent granted otherwise than necessitated by the prior art.

I claim as my invention:

1. In a fare box, rotatable fare receiving means, a continuous cam groove formed therein, a roller continuously engaged in said groove, a swinging lever connected with said roller and adapted to be swung by the rotation of said fare receiving means, a plurality of registering means, shiftable means for selectively operating said registering means in accordance with the physical characteristics of the fare to be registered, and fare controlled means for connecting said shiftable means with the swinging lever.

2. In a fare box, rotatable fare receiving means, a continuous cam groove formed therein, a roller continuously engaged in said groove, a swinging lever connected with said roller and adapted to be swung by the rotation of said fare receiving means, a plurality of registering means, a slidably mounted shaft, a plurality of gears fixed on said shaft for selectively operating said registering means, and fare controlled means for connecting said shaft with the swinging lever to selectively move said gears into proper registering position.

3. In a fare box, rotatable fare receiving means, a continuous cam groove formed therein, a roller engaged in said groove, a swinging lever connected with the roller and adapted to be swung by the rotation of the fare receiving means, a plurality of registering means, a slidably mounted shaft, a plurality of gears fixed on said shaft for selectively operating said registering means, fare controlled means for connecting said shaft with the swinging lever, locking means associated with the registering means and normally engaging the shaft to prevent operation of said registering means, and cutaway portions in the slidable shaft adapted to permit operation of one of said registering means when the gear for operating the same is shifted into position.

4. In a fare box, fare receiving means, a plurality of registering means, and a slidable operative connection including a plurality of coaxial longitudinally spaced gears between said receiving and registering means.

5. In a fare box, rotatable fare receiving means, a continuous cam groove formed therein, a roller engaged in said groove, a swinging lever connected with the roller and adapted to be swung by the rotation of the fare receiving means, a plurality of registering means, a slidably mounted shaft, a plurality of gears fixed on said shaft for selectively operating said registering means, fare controlled means for connecting said shaft with the swinging lever, locking means associated with the registering means and normally engaging the shaft to prevent operation of said registering means, and cutaway portions in the shaft adjacent each gear adapted to permit operation of one of said registering means when the gear for operating the same is shifted into position.

6. In a fare box, fare receiving means, a plurality of registering means, means for selectively connecting the receiving means to the registering means, and means contacting said selecting means for locking the registering means from operation.

7. In a fare box, fare receiving means, a plurality of registering means, slidable connecting means between said receiving and registering means, including a plurality of coaxial longitudinally spaced, relatively fixed gears and means for moving said connecting means into operative position.

8. In a fare box, fare receiving means, a plurality of registering means, connecting means including plurality of coaxial longitudinally spaced relatively fixed gears between said receiving and registering means, and a positive mechanism for moving said connecting means into and out of operative position.

9. In a fare box, fare receiving means, a plurality of registering means, connecting means between said receiving and registering means, a swinging cam operated mechanism for moving said connecting means into and out of operative position, and means for normally locking said mechanism out of operation.

10. In a fare box, rotatable fare receiving means, swinging arm connected to the fare receiving means to operate when said means are rotated, a plurality of registers, shiftable register actuating means, means associated with and normally disconnected from the swinging arm for shifting said actuating means, and coin controlled means for temporarily connecting said shifting means to the swinging arm.

11. A fare box comprising fare receiving means, a drive therefor, a plurality of registering means, a selective control mechanism for said registering means, and a swinging connection from the drive to said control and means whereby a part of said swinging connection is continuously driven by the fare receiving means.

12. A fare box comprising rotatable fare receiving means, a cam rotatable therewith, a rocker continuously operated by the cam, a plurality of registering mechanisms, relatively fixed gears for selectively operating the same, and means for connecting the rocker to shift said gears into operative position.

13. A fare box comprising fare receiving means, a plurality of registering mechanisms, relatively fixed coaxial gears for selectively operating the registering mechanisms, and a cam operated mechanism for moving said gears into operative position, said mechanism being continuously driven but normally disconnected from said gears.

14. A fare box comprising rotatable fare receiving means, a cam rotatable therewith, a rocker continuously operated by the cam, a plurality of registering mechanisms, coaxial relatively fixed gears for selectively operating the same, and a fare controlled pawl and ratchet mechanism for connecting the rocker to shift said gears into operative position.

15. In a fare box, a rotatable fare receiving means, a cam associated therewith, a pivoted lever adapted to be rocked by said cam when the fare receiving means are rotated, a series of depressions in the end of said lever, a plurality of registering means, shiftable means for selectively operating said registering means, and fare actuated means adapted to be selectively engaged in one of the depressions in the lever to afford a communication between the same and said shiftable means.

16. In a fare box, a rotatable fare receiving means, a cam associated therewith, a pivoted lever adapted to be rocked by the cam when the fare receiving means are rotated, a series of depressions in the end of said lever, a plurality of registering means, shiftable means for selectively operating said registering means, means adapted to be operatively engaged in one of the depressions in the lever to afford a connection between the same and said shiftable means, and fare releasing means for locking said third mentioned means from operation.

17. A fare box comprising fare receiving means, a plurality of registering mechanisms, a slidably mounted shaft, gears fixed on the shaft adapted to be shifted to selectively operate the registering mechanisms, and means adapted to normally engage the shaft and prevent the operation of the registering mechanisms.

18. A fare box comprising fare receiving means, a plurality of registering means, a cam controlled mechanism comprising a slidable member and a swinging member, said swinging member being continuously connected to the cam, for selectively connecting the receiving means with the registering means and fare controlled means for rendering said mechanism operative to register a fare.

19. A fare box comprising fare receiving means, a plurality of registering means, a slidable selective control for the registering means, and a continuously movable cam operated swinging mechanism for shifting said control into operative position.

20. In a fare box, rotatable fare receiving means, a continuous cam groove on the rear thereof, a swinging arm parallel to the fare receiving means and connected for continuous movement with said cam groove, a plurality of fare registers, slidably mounted longitudinally spaced coaxial gears, for selectively actuating said registers, a connection associated with the swinging arm for shifting said gears into operative position, and coin controlled means for temporarily connecting said arm to said connection.

21. In a fare box, a plurality of gear trains, a shiftable member having a segmental gear adapted to be brought into meshing relation with one of said gear trains, a locking member in each gear train normally co-operating with said shiftable member for locking said gear trains from operation but passing out of such locking relation when said segmental gear is brought into meshing relation with the gear train.

22. In a fare box, a plurality of gear trains for actuating registering mechanism, a shiftable gear for selectively engaging said gear trains, and mechanism controlled by the diameter of the coins or tokens in the fare box for selectively engaging said gear and gear trains.

23. In a fare box, a plurality of gear trains, a rotary and shiftable member embodying a gear for selectively engaging said gear trains, rotary means engaging said member for shifting the same, and coin controlled means for operating said rotary means.

24. In a fare box, a plurality of gear trains for operating registering mechanism, a shiftable gear for selectively engaging one of said gear trains, and coin controlled mechanism for shifting said shiftable gear, said coin controlled mechanism comprising a pair of members having a variable connection with each other.

25. In a fare box, a plurality of gear trains for operating registering mechanism, a shiftable member adapted to be brought into engagement with one of said gear trains, coin controlled mechanism for shifting said member, said coin controlled mechanism comprising a pair of lever members and means for connecting said lever members for conjoint movement.

26. In a fare box, a plurality of gear trains, a shiftable gear for engaging one of said gear trains, an oscillatable element connected to said shiftable gear, a second oscillatable element and means controlled by the diameter of a coin for operatively connecting said elements.

27. In a fare box, a plurality of gear trains for operating registering mechanism, a shiftable gear for selectively engaging one of said gear trains, a power driven element, mechanism for shifting said shiftable gear, comprising a connection located in the path of said element and coin controlled means for operating said connection into engagement with said element.

28. In a fare box, a plurality of gear trains for operating registering mechanism, a shiftable gear for selectively engaging said gear trains, an oscillatable element connected to said shiftable gear for shifting the same, a power driven member, a connection carried by said element and means governed by the diameter of a coin for operating said connection into engagement with said member.

29. In a fare box, a plurality of gear trains adapted for operating registering mechanism, a shiftable gear for connection with one of said gear trains, a movable element connected to said shiftable gear, driving mechanism and coin controlled means for effecting an operative relation between said element and driving mechanism at predetermined times according to the diameter of the coin passing thru said fare box.

In testimony whereof I have hereunto subscribed my name.

ERNEST H. THOMPSON.